(12) United States Patent
Tiwari et al.

(10) Patent No.: US 11,354,962 B2
(45) Date of Patent: Jun. 7, 2022

(54) METHOD FOR COMMISSIONING SYSTEM FOR DOOR IDENTIFICATION USING LOCATION FINGERPRINTING

(71) Applicant: Carrier Corporation, Palm Beach Gardens, FL (US)

(72) Inventors: Ankit Tiwari, South Windsor, CT (US); Kunal Srivastava, Manchester, CT (US); Pedro Fernandez-Orellana, Shanghai (CN); Yuri Novozhenets, Pittsford, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/057,483

(22) PCT Filed: Apr. 17, 2019

(86) PCT No.: PCT/US2019/027847
§ 371 (c)(1),
(2) Date: Nov. 20, 2020

(87) PCT Pub. No.: WO2019/226258
PCT Pub. Date: Nov. 28, 2019

(65) Prior Publication Data
US 2021/0312741 A1 Oct. 7, 2021

(30) Foreign Application Priority Data
May 21, 2018 (CN) .......................... 201810492199.2

(51) Int. Cl.
*G07C 9/28* (2020.01)
*H04B 17/27* (2015.01)
(Continued)

(52) U.S. Cl.
CPC ........... *G07C 9/28* (2020.01); *G07C 9/00571* (2013.01); *G07C 9/00904* (2013.01);
(Continued)

(58) Field of Classification Search
CPC .................................... G07C 9/00; G07C 9/28
See application file for complete search history.

(56) References Cited

U.S. PATENT DOCUMENTS 8,941,465 B2 * 1/2015 Pineau .................. H04W 12/06
340/5.2
9,311,586 B2 4/2016 Robinette et al.
(Continued)

FOREIGN PATENT DOCUMENTS

CN 202117430 U 1/2012
EP 2130312 A1 12/2009
(Continued)

OTHER PUBLICATIONS

Anonymous: "Wi-Fi Positioning System—Wikipedia"; May 16, 2018; 4 pages.
(Continued)

*Primary Examiner* — K. Wong
(74) *Attorney, Agent, or Firm* — Cantor Colburn LLP

(57) ABSTRACT

A method of determining a relative location of one or more access controls is provided. The method including: detecting a first wireless signal from a first access control; determining a unique device identifier (UDID) for the first access control in response to the first wireless signal; determining a received signal strength indicator (RSSI) of the first wireless signal; and generating a location fingerprint to associate the RSSI of the first wireless signal with the UDID for the first access control.

20 Claims, 3 Drawing Sheets

Figure 1:
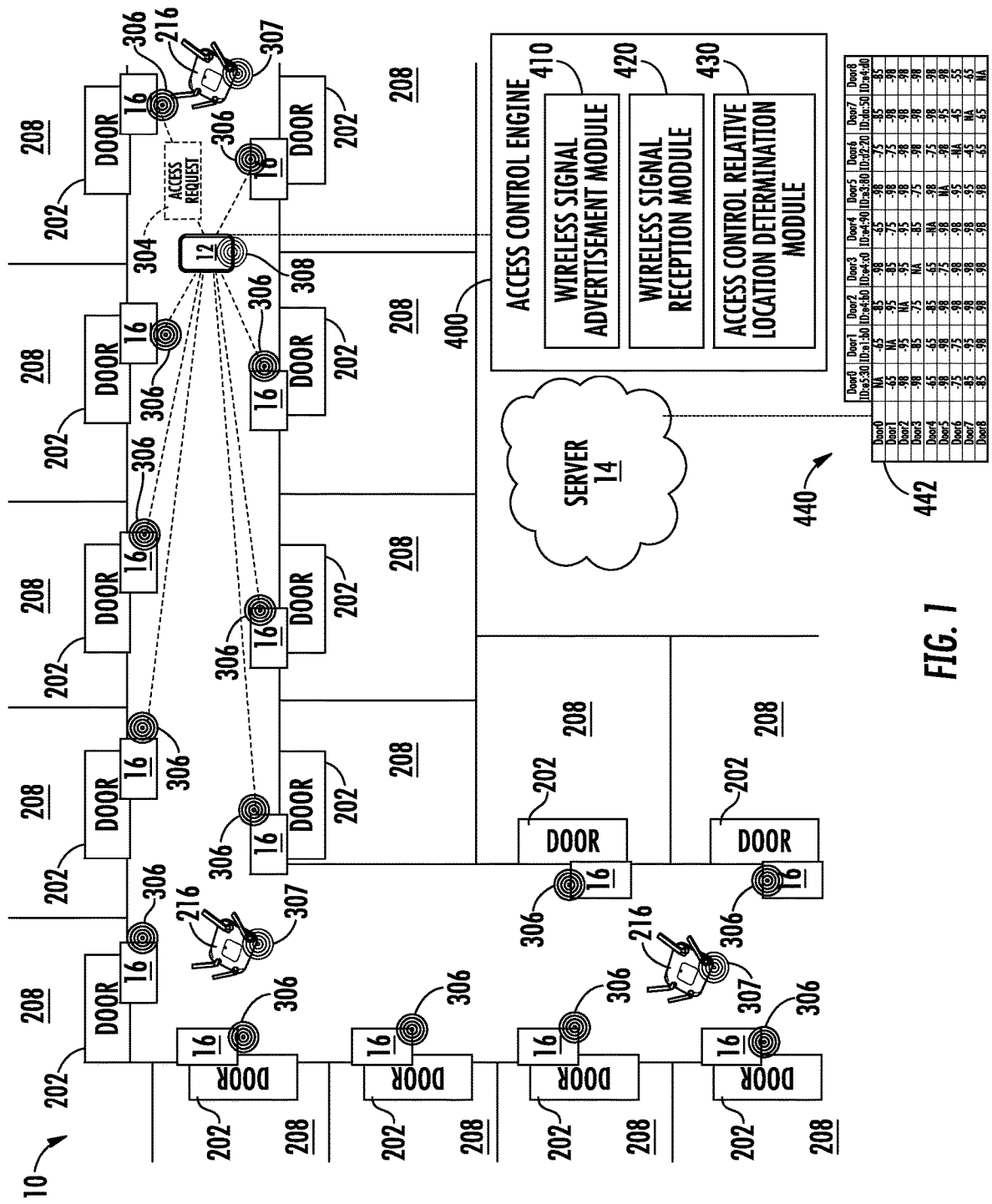

(51) Int. Cl.
  *H04B 17/318* (2015.01)
  *H04W 4/33* (2018.01)
  *H04W 4/029* (2018.01)
  *G07C 9/00* (2020.01)
  *H04W 64/00* (2009.01)

(52) U.S. Cl.
  CPC ........... *H04B 17/27* (2015.01); *H04B 17/318* (2015.01); *H04W 4/029* (2018.02); *H04W 4/33* (2018.02); *H04W 64/00* (2013.01); *G07C 2209/63* (2013.01)

(56) References Cited

U.S. PATENT DOCUMENTS

| | | | |
|---|---|---|---|
| 9,384,607 B1* | 7/2016 | Copeland | G07C 9/00309 |
| 9,508,206 B2 | 11/2016 | Ahearn et al. | |
| 9,524,594 B2* | 12/2016 | Ouyang | G07C 9/00571 |
| 9,524,601 B1 | 12/2016 | Dumas | |
| 9,591,013 B2* | 3/2017 | Baxley | H04W 4/90 |
| 9,761,070 B2 | 9/2017 | Juzswik | |
| 9,805,533 B2 | 10/2017 | Shin et al. | |
| 9,865,144 B2* | 1/2018 | Trani | G08B 13/19695 |
| 10,275,968 B2* | 4/2019 | Troesch | G07C 9/00904 |
| 10,740,995 B2* | 8/2020 | Ashok | G07C 9/28 |
| 11,069,167 B2* | 7/2021 | Einberg | G07C 9/257 |
| 2015/0056980 A1 | 2/2015 | Grondin et al. | |
| 2015/0279132 A1 | 10/2015 | Perotti | |
| 2017/0074000 A1 | 3/2017 | Banvait | |
| 2017/0323123 A1 | 11/2017 | Rabb et al. | |

FOREIGN PATENT DOCUMENTS

| | | |
|---|---|---|
| EP | 3229534 A1 | 10/2017 |
| WO | 2014120469 A1 | 8/2014 |
| WO | 2016087541 A1 | 6/2016 |
| WO | 2016172050 A1 | 10/2016 |
| WO | 2016183010 A1 | 11/2016 |
| WO | 2017199065 A1 | 11/2017 |

OTHER PUBLICATIONS

J-C. Yang, et al., "An Intelligent Automated Door Control System Based on a Smart Camera", MDPI, May 13, 2013, p. 1-15.
Notification of Transmittal of the International Search Report for International Application No. PCT/US2019/027847: Report dated Jun. 24, 2019; 6 pages.
Simon Jensen; "Proximity Door Locking"; Sep. 16, 2016; Technical University of Denmark; 1-99 pages.
Woollaston, V. et al., "The Smart Lock That Lets You Open Your Front Door Using Just Your Phone—And Can Even Let in Guests When You're Not Home", Daily Mail Online, May 30, 2013, p. 1-61.
Written Opinion of the Internation Searching Authority for International Application No. PCT/US2019/027847: Report dated Jun. 24, 2019; 11 pages.
Yiu Simon et al; "Wireless RSSI Fingerprinting Localization"; Signal Processing, Elsevier Science Publishers B.V. Amsterdam. NL, vol. 131, Jul. 14, 2016; pp. 235-244.
First Indian Office Action for Application No. 202017052496; Report dated Sep. 7, 2021; 6 pages.

* cited by examiner

US 11,354,962 B2

METHOD FOR COMMISSIONING SYSTEM FOR DOOR IDENTIFICATION USING LOCATION FINGERPRINTING

CROSS-REFERENCE TO RELATED APPLICATIONS

This application is a National Stage Application of International Application No. PCT/US2019/027847 filed Apr. 17, 2019, which claims the benefit of Chinese Application No. 201810492199.2 filed May 21, 2018, the disclosures of which are incorporated herein by reference in their entirety.

BACKGROUND

The subject matter disclosed herein generally relates to the field of access control systems, and more particularly to an apparatus and method for operating access control systems.

Existing access controls may allow an individual to unlock rooms via a key a mobile device but may have difficulty determining where the room is in relation to other rooms.

BRIEF SUMMARY

According to an embodiment, a method of determining a relative location of one or more access controls is provided. The method including: detecting a first wireless signal from a first access control; determining a unique device identifier (UDID) for the first access control in response to the first wireless signal; determining a received signal strength indicator (RSSI) of the first wireless signal; and generating a location fingerprint to associate the RSSI of the first wireless signal with the UDID for the first access control.

In addition to one or more of the features described above, or as an alternative, further embodiments may include: transmitting the location fingerprint to a server.

In addition to one or more of the features described above, or as an alternative, further embodiments may include that the location fingerprint is transmitted to the server through a mobile device.

In addition to one or more of the features described above, or as an alternative, further embodiments may include that the server is configured to update a location fingerprint array in response to the location fingerprint.

In addition to one or more of the features described above, or as an alternative, further embodiments may include that the server is configured to determine a location of a mobile device in response to the location fingerprint array and a distance between the first access control and the mobile device.

In addition to one or more of the features described above, or as an alternative, further embodiments may include: detecting a second wireless signal from the first access control; determining the UDID for the first access control in response to the second wireless signal; determining an RSSI of the second wireless signal; and updating the location fingerprint of the UDID for the first access control in response to the RSSI of the first wireless signal and the RSSI of the second wireless signal.

In addition to one or more of the features described above, or as an alternative, further embodiments may include: detecting a second wireless signal from a second access control; determining a UDID for the second access control in response to the second wireless signal; determining an RSSI of the second wireless signal; and updating the location fingerprint to associate the RSSI of the second wireless signal with the UDID for the second access control.

In addition to one or more of the features described above, or as an alternative, further embodiments may include: transmitting the location fingerprint to a server.

In addition to one or more of the features described above, or as an alternative, further embodiments may include that the location fingerprint is transmitted to the server through a mobile device.

In addition to one or more of the features described above, or as an alternative, further embodiments may include that the server is configured to update a location fingerprint array in response to the location fingerprint.

In addition to one or more of the features described above, or as an alternative, further embodiments may include that the server is configured to determine a location of a mobile device in response to the location fingerprint array and a distance between the mobile device and at least one of the first access control.

According to another embodiment, a computer program product tangibly embodied on a computer readable medium is provided. The computer program product including instructions that, when executed by a processor, cause the processor to perform operations including: detecting a first wireless signal from a first access control; determining a unique device identifier (UDID) for the first access control in response to the first wireless signal; determining a received signal strength indicator (RSSI) of the first wireless signal; and generating a location fingerprint to associate the RSSI of the first wireless signal with the UDID for the first access control.

In addition to one or more of the features described above, or as an alternative, further embodiments may include that the operations further include: transmitting the location fingerprint to a server.

In addition to one or more of the features described above, or as an alternative, further embodiments may include that the location fingerprint is transmitted to the server through a mobile device.

In addition to one or more of the features described above, or as an alternative, further embodiments may include that the server is configured to update a location fingerprint array in response to the location fingerprint.

In addition to one or more of the features described above, or as an alternative, further embodiments may include that the server is configured to determine a location of a mobile device in response to the location fingerprint array and a distance between the first access control and the mobile device.

In addition to one or more of the features described above, or as an alternative, further embodiments may include that the operations further include: detecting a second wireless signal from the first access control; determining the UDID for the first access control in response to the second wireless signal; determining an RSSI of the second wireless signal; and updating the location fingerprint of the UDID for the first access control in response to the RSSI of the first wireless signal and the RSSI of the second wireless signal.

In addition to one or more of the features described above, or as an alternative, further embodiments may include that the operations further include: detecting a second wireless signal from a second access control; determining a UDID for the second access control in response to the second wireless signal; determining an RSSI of the second wireless signal; and updating the location fingerprint to associate the RSSI of the second wireless signal with the UDID for the second access control.

In addition to one or more of the features described above, or as an alternative, further embodiments may include that the operations further include: transmitting the location fingerprint to a server.

In addition to one or more of the features described above, or as an alternative, further embodiments may include that the location fingerprint is transmitted to the server through a mobile device.

Technical effects of embodiments of the present disclosure transmitting and receiving wireless signals between access controls in order to map the relative location of multiple access controls.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
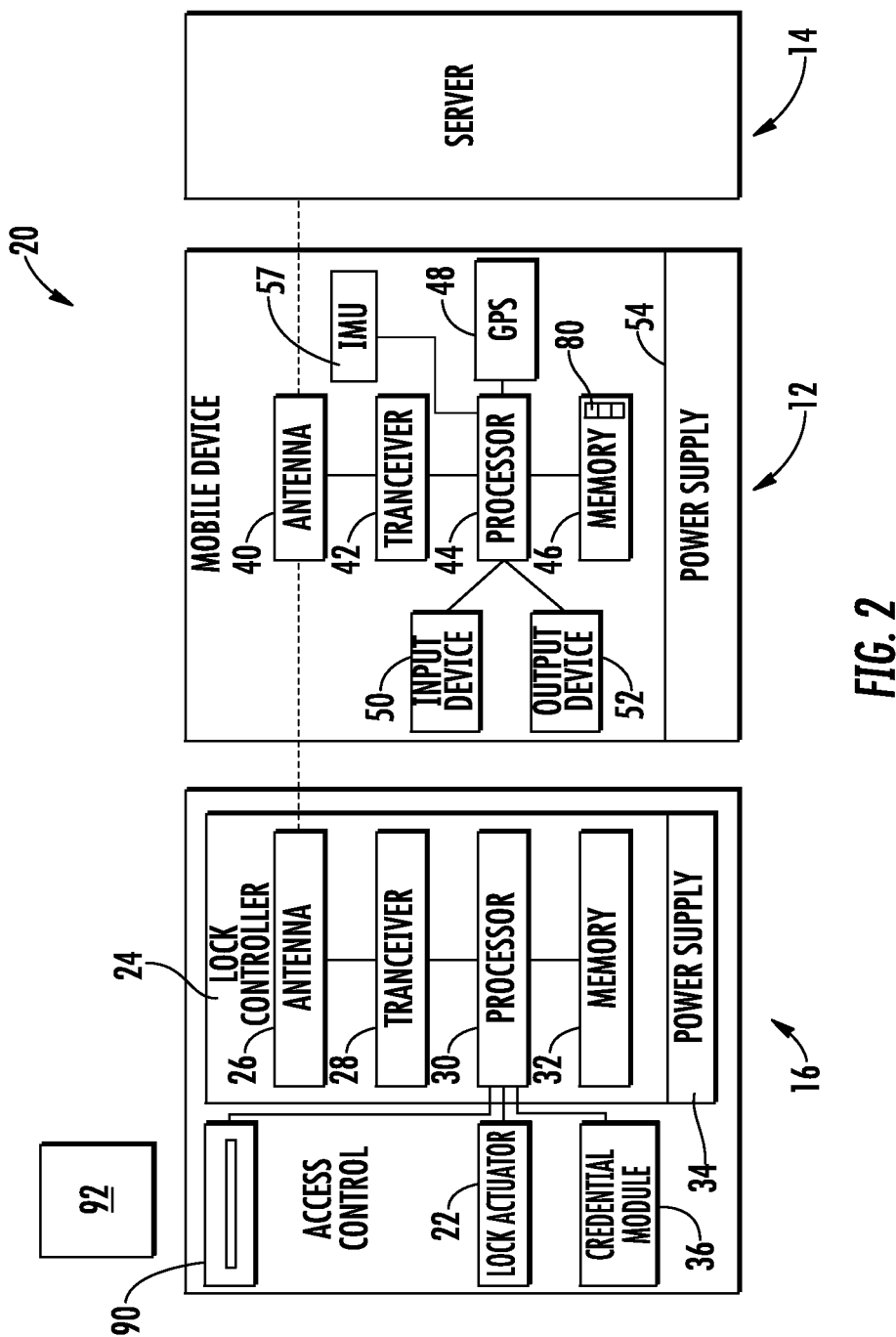
Figure 3:
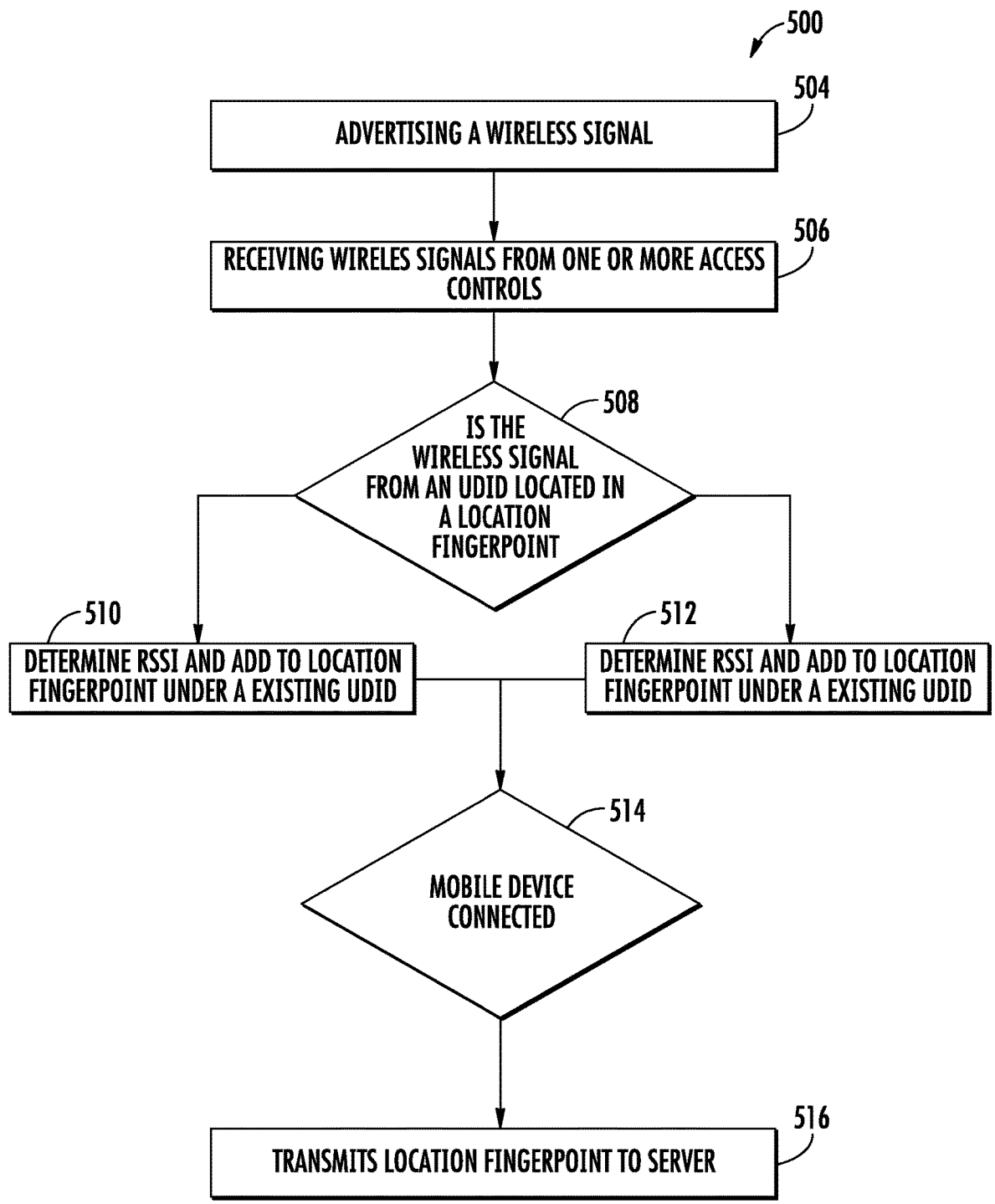

The following descriptions should not be considered limiting in any way. With reference to the accompanying drawings, like elements are numbered alike:

FIG. 1 illustrates a general schematic system diagram of an access control system, in accordance with an embodiment of the disclosure;

FIG. 2 illustrates a block diagram of an access control, mobile device and server of the access control system of FIG. 1, in accordance with an embodiment of the disclosure; and FIG. 3 is a flow diagram illustrating a method of determining a location of one or more access controls through intercommunication between the one or more access controls, according to an embodiment of the present disclosure.

DETAILED DESCRIPTION

A detailed description of one or more embodiments of the disclosed apparatus and method are presented herein by way of exemplification and not limitation with reference to the Figures.

FIG. 1 schematically illustrates an access control system 10. The system 10 generally includes a mobile device 12, a server 14, a wireless access protocol device 216, and an access control 16. The access control system 10 may include any number of access controls 16. It should be appreciated that, although particular systems are separately defined in the schematic block diagrams, each or any of the systems may be otherwise combined or separated via hardware and/or software. In the illustrated embodiment, the access controls 16 may control access through a door 202 to a room 208. The access control system 10 may include any number of doors 202 and rooms 208. Further, there may be multiple doors 202 and access controls 16 for each room 208. It is understood that while the access control system 10 utilizes a door 202 and room 208 system for exemplary illustration, embodiments disclosed herein may be applied to other access control systems such as, for example, elevators, turnstiles, safes, cars, garage doors, thermostats, etc.

A mobile device 12 belonging to an individual may be granted access to one or more access controls 16 (e.g. the door lock on an office or hotel room assigned to the individual). In one example, when an individual begins working at a new building their mobile device 12 will be granted access to particular rooms 208 where they are allowed to enter and/or work. In another example, when an individual checks into the hotel room their mobile device 12 will be granted access to a room 208. There may be one or more mobile devices 12 assigned to a room 208 (e.g. a husband and a wife in a hotel; or multiple workers in a collaborative workspace), thus embodiments disclosed herein may apply to multiple mobile devices per room 208. An individual may utilize their mobile device 12 to unlock and/or lock the access control 16 operably connected to their assigned room 208 through an access request 304. The mobile device 12 may store credentials to unlock and/or lock the access control 16. Some credentials may be used for multiple access controls 16 if there are multiple access controls 16 for a single assigned room 208 or the individual is assigned access to multiple rooms 208. For example, an access control 16 operably connected to an individual's hotel room and an access control 16 operably connected to a hotel pool may respond to the same credential. Other credentials may be specific to a single access control 16.

Wireless communication may occur between the access control 16 and the mobile device 12 or other access controls 16 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 or other access controls 16 may have to be within a selected range of the access control 16 in order to utilize short-range wireless communication. For example, the selected range may be manually set by an individual as a chosen range or automatically set based on the limitations of hardware associated with the mobile device 12 and/or the access control 16.

Each access control 16 is a wireless-capable, restricted-access, or restricted-use device such as wireless locks, access control readers for building entry, and other restricted-use machines. The mobile device 12 submits credentials to the access controls 16, thereby selectively permitting a user to actuate (i.e., access or activate) functions of the access controls 16. A user may, for example, submit a credential to an electromechanical lock to unlock it, and thereby gain access to a room 208.

The mobile device 12 may transmit an access request 304 to the access control 16 by short-range radio transmission when the mobile device 12 is placed proximate the access control 16. The mobile device 12 is a wireless capable handheld device such as a smartphone that is operable to communicate with the server 14 and the access controls 16. The server 14 may provide credentials and other data to the access control 16, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data. The access controls 16 may communicate directly with the server 14 or through the wireless access protocol devices 307 or through the mobile device 12.

The system 10 may include an access control mapping engine 400 configured to determine relative location of one or more access controls 16. The relative locations may be captured in a radio frequency (RF) fingerprint array 440. The access control mapping engine 400 is comprised of modules including a wireless signal advertisement module 410; a wireless signal reception module 420; and an access control relative location determination module 430. Each module 410, 420, 430 may be located on the mobile device 12, the server 14, or access controls 16. Alternatively, the modules 410, 420, 430 may be distributed between the mobile device 12, the server 14, and access controls 16. In an embodiment, an access control mapping engine 400 is located within each access control 16.

The wireless signal advertisement module 410 is configured to advertise a wireless signal 306 and the wireless signal reception module 420 is configured to receive wireless signals 306. In an example, each access control 16 may include a wireless signal advertisement module 410 and wireless signal reception module 420, thus each access control 16 may transmit a wireless signal 306 and receive wireless signals 306 from other access controls. The wireless signals 306 may be continuously transmitted or transmitted periodically for selected durations.

The advertisement of the wireless signal 306 is the access control 16 declaring its presence to any nearby listening device and if it is a connectable advertisement it is an opportunity for another device (i.e., nearby mobile device 12 or other access control 16) to connect to the access control 16. The wireless signal 306 of the access control 16 may be a Bluetooth signal. The wireless signal 306 includes a unique device identifier (UDID). The wireless signal 306 may also include info about the door 202 associated with the access control 16 advertising the wireless signal 306, a type of the access control 16, etc.

Each access control 16 is configured to receive the wireless signals 306 projected by other access controls 16. The access control relative location determination module 430 is configured to extract wireless signal characteristics from each wireless signal 306 received. The wireless signal characteristics may include the UDID of the access control 16 that advertised the wireless signal 306. The access control relative location determination module 430 may also determine a signal strength or received signal strength indicator (RSSI) of each wireless signal 306 received. The access control relative location determination module 430 is configured to create a location fingerprint 442 of the UDID and associated RSSI for each nearby access control 16 advertising a wireless signal 306. The location fingerprint 442 may be continuously updated based on new wireless signals 306 received. Each RSSI for the location fingerprint 442 may be updated based upon average, min-max, deviation, etc. The location fingerprint 442 may be then transmitted from the access control 16 to a server 14 to construct an RF fingerprint array 440 having location fingerprint 442 from a plurality of different access controllers 16. The location fingerprint 442 may be transmitted directly from each access control 16 to the server or transmitted from the access control 16 to the server 14 through a mobile device 12.

The access control relative location determination 430 is configured to generate a map of the location of each access control 16 in response to the RF fingerprint array 440. In a few non-limiting example the map may be graphical, pictorial, or a coordinate matrix. In another example, the fingerprint array 440 may be the representation, which captures the relative location information. In yet another example, if the location/coordinates of a few "anchor" nodes (e.g., access controls 16) are known, then this information can be used along with the fingerprint array 440 and a wireless signal propagation model to compute a coordinate matrix for each access control 16. The map may depict the access controls 16 relative to each other and/or may map the actual location of each access control 16 within a building in a non-limiting example. Advantageously, this allows access control system 10 to be installed with increased speed and accuracy because the location of each access control 16 is determined automatically. Also advantageously, this allows the access controls 16 within the access control system 10 to be rearranged and the location of each access control 16 to be mapped automatically by wireless signal 306 advertisements between access controls 16.

Utilizing the fingerprint array 440, a location of the mobile device 12 may be determined by triangulating the distance of the mobile device 12 between multiple access controls 16 within the fingerprint array 440. The mobile device 12 may be configured to detect the wireless signal 306 and then determine distance between the mobile device 12 and each access control 16 in response to a signal strength of the wireless signal 306.

In another embodiment, the mobile device 12 may be configured to advertise a wireless signal 308. The advertisement is the mobile device 12 declaring its presence to any nearby listening device and if it is a connectable advertisement it is an opportunity for another device (i.e., access control 16) to detect this advertisement and triangulate the location of the mobile device 12. The access controls 16 may be configured to detect the wireless signal 308 and then determine distance between the mobile device 12 and each access control 16 in response to a signal strength of the wireless signal 308. In an embodiment, each access control 16 may detect the wireless signal 308, determine the wireless signal strength, and then pass this information off to the server 14 to determine the approximate distance between the mobile device 12 and each access control 16.

The location of the mobile device 16 may be triangulated by relaying up to the location determination module 420 the strength of each wireless signal 308 detected and then triangulating the position of the mobile device 12. Wireless signal interaction data between the mobile device 12 and the access device 216 may transmitted to the server 14 to determined positional data. The server 14 may use signal strength detected between the mobile device 12, access controls 16, and the wireless access protocol device 216 to determine positional data of the mobile device 12.

Referring now to FIG. 2 with continued reference to FIG. 1. FIG. 2 shows a block diagram of an example electronic lock system 20 includes the access control 16, the mobile device 12, and the server 14. The access control 16 generally includes a lock actuator 22, a lock controller 24, a lock antenna 26, a lock transceiver 28, a lock processor 30, a lock memory 32, a lock power supply 34, a lock card reader 90 and a credential module 36. The access control 16 may have essentially two readers, one reader 90 to read a physical key card 92 and the credential module 36 to communicate with the mobile device 12 via the lock processor 30 and the transceiver 28 and antenna 26. In addition to utilizing the mobile device 12 to actuate the access control 16, a physical key card 92 may also be used to actuate the access control 16 by being inserted into the access control 16 for the access control 16 to read the physical key card 92 (e.g. a magnetic strip on an encoded card 92). The physical key card 92 is capable of being encoded with card data, such as, for example, a magnetic strip or RFID chip. The card data may include credentials to grant access to a specific access control 16. For example, for a period the mobile device 12 may be granted access to a specific access control 16, such as, for example, a period of stay/employment for the individual possessing the mobile device 12.

The access control 16 is responsive to credentials from the mobile device 12, and may, for example, be the lock of a turnstile or a door lock. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately. In an embodiment, the access control 16 is composed of separate components including a reader (e.g., transceiver 28 and/or antenna 26) at a door 202, a processor 30 that gets the credential from the reader, and then a lock actuator 22 that gets a signal from the processor 30 to actuate an electromechanical lock.

The lock transceiver 28 is capable of transmitting and receiving data to and from at least one of the mobile device 12, the wireless access protocol device 216, and the other access controls 16. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, a key power supply 54, and an inertial measurement unit (IMU) sensor 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The IMU sensor 57 may be a sensor such as, for example, an accelerometer, a gyroscope, or a similar sensor known to one of skill in the art.

Referring now to FIG. 3 with continued reference to FIGS. 1-2. FIG. 3 shows a flow chart of a method 500 of determining a relative location of one or more access controls 16. The method 500 may be performed by an access control 16, and/or a server 14. At block 504, an access control 16 advertises a wireless signal 306. At block 506, the access control 16 receives wireless signals 306 from one or more other access controls 16.

At block 508, the access control 16 determines whether or not the wireless signals from one or more other access controls 16 are already included in a location fingerprint 442. If no location fingerprint 442 exists, the access control generates a new location fingerprint 442. The access control 16 determines a UDID for each of the access controls 16 that advertised a wireless signal 306. The access control 16 also determines an RSSI for each wireless signal 306 received. At block 510, if the UDID is new and is not contained in a location fingerprint 442 then the access control 16 adds the UDID and associated RSSI for the UDID to the location fingerprint 442. At block 512, if the UDID is not new and is contained in a location fingerprint 442 then the access control 16 updates the existing UDID with the new RSSI in the location fingerprint 442. The location fingerprint 442 may then be transmitted to a server 14 either directly or through the mobile device 12. At block 514, the mobile device 12 connects to the access control 16 and then transmits the location fingerprint 442 to the server 14 at block 516. Once received, the server 14 is configured to combine the location fingerprint 442 with other location fingerprints 442 received from other access controls 16 and composes an RF fingerprint array 440. A location of a mobile device 12 may be determined in response to the RF fingerprint array 440 and a determined distance between the mobile device 12 and one or more access controls 16 using triangulation, as described above.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of determining a relative location of one or more access controls, the method comprising:
   detecting a first wireless signal from a first access control of the one or more access controls;
   determining a unique device identifier (UDID) for the first access control based on to the first wireless signal;
   determining a received signal strength indicator (RSSI) of the first wireless signal; and
   generating a location fingerprint to associate the RSSI of the first wireless signal with the UDID for the first access control,
   wherein the relative location is a location of each of the one or more access controls relative to each other, and
   wherein each of the one or more access controls is a door lock or a turnstile lock.

2. The method of claim 1, further comprising:
   transmitting the location fingerprint to a server.

3. The method of claim 2, wherein the location fingerprint is transmitted to the server through a smart phone.

4. The method of claim 2, wherein the server is configured to update a location fingerprint array based on the location fingerprint.

5. The method of claim 2, wherein the server is configured to determine a location of a smart phone based on the location fingerprint array and a distance between the first access control and the smart phone.

6. The method of claim 1, further comprising:
   detecting a second wireless signal from the first access control;
   determining the UDID for the first access control based on the second wireless signal;
   determining an RSSI of the second wireless signal; and
   updating the location fingerprint of the UDID for the first access control based on the RSSI of the second wireless signal.

7. The method of claim 1, further comprising:
   detecting a second wireless signal from a second access control;
   determining a UDID for the second access control based on the second wireless signal;
   determining an RSSI of the second wireless signal; and
   updating the location fingerprint to associate the RSSI of the second wireless signal with the UDID for the second access control.

8. The method of claim 7, further comprising:
   transmitting the location fingerprint to a server.

9. The method of claim 8, wherein the location fingerprint is transmitted to the server through a smart phone.

10. The method of claim 8, wherein the server is configured to update a location fingerprint array based on the location fingerprint.

11. The method of claim 8, wherein the server is configured to determine a location of a smart phone based on the location fingerprint array and a distance between the smartphone and at least one of the first access control and the second access control.

12. A computer program product tangibly embodied on a computer readable medium, the computer program product including instructions that, when executed by a processor, cause the processor to perform operations comprising:
    detecting a first wireless signal from a first access control of one or more access controls;
    determining a unique device identifier (UDID) for the first access control based on the first wireless signal;
    determining a received signal strength indicator (RSSI) of the first wireless signal; and
    generating a location fingerprint to associate the RSSI of the first wireless signal with the UDID for the first access control,
    wherein the relative location is a location of each of the one or more access controls relative to each other, and
    wherein each of the one or more access controls is a door lock or a turnstile lock.

13. The computer program product of claim 12, wherein the operations further comprise:
    transmitting the location fingerprint to a server.

14. The computer program product of claim 13, wherein the location fingerprint is transmitted to the server through a smart phone.

15. The computer program product of claim 13, wherein the server is configured to update a location fingerprint array based on the location fingerprint.

16. The computer program product of claim 13, wherein the server is configured to determine a location of a smart phone based on the location fingerprint array and a distance between the first access control and the smart phone.

17. The computer program product of claim 12, wherein the operations further comprise:
    detecting a second wireless signal from the first access control;
    determining the UDID for the first access control based on the second wireless signal;
    determining an RSSI of the second wireless signal; and
    updating the location fingerprint of the UDID for the first access control based on the RSSI of the second wireless signal.

18. The computer program product of claim 12, wherein the operations further comprise:
    detecting a second wireless signal from a second access control;
    determining a UDID for the second access control based on the second wireless signal;
    determining an RSSI of the second wireless signal; and updating the location fingerprint to associate the RSSI of the second wireless signal with the UDID for the second access control.

19. The computer program product of claim 18, wherein the operations further comprise:

transmitting the location fingerprint to a server.

20. The computer program product of claim 19, wherein the location fingerprint is transmitted to the server through a smart phone.

\* \* \* \* \*